United States Patent
Gan et al.

(10) Patent No.: US 6,623,887 B2
(45) Date of Patent: Sep. 23, 2003

(54) SILVER VANADIUM OXIDE CATHODE MATERIAL FOR HIGH DISCHARGE RATE LITHIUM CELLS

(75) Inventors: Hong Gan, E. Amherst, NY (US); Esther S. Takeuchi, E. Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 104 days.

(21) Appl. No.: 09/793,246

(22) Filed: Feb. 26, 2001

(65) Prior Publication Data

US 2003/0082449 A1 May 1, 2003

Related U.S. Application Data

(60) Provisional application No. 60/195,006, filed on Apr. 6, 2000.

(51) Int. Cl.⁷ .............................. H01M 4/34
(52) U.S. Cl. ............ 429/219; 429/231.5; 429/231.95; 429/330; 429/231.2; 252/182.1
(58) Field of Search ............ 429/219, 231.2, 429/231.5, 231.95, 330; 252/182.1

(56) References Cited

U.S. PATENT DOCUMENTS

| | | | |
|---|---|---|---|
| 4,310,609 A | 1/1982 | Liang et al. | 429/219 |
| 4,391,729 A | 7/1983 | Liang et al. | 252/182.1 |
| 4,830,940 A | 5/1989 | Keister et al. | 429/194 |
| 5,221,453 A | 6/1993 | Crespi | 204/291 |
| 5,389,472 A | 2/1995 | Takeuchi et al. | 429/219 |
| 5,472,810 A | 12/1995 | Takeuchi et al. | 429/219 |
| 5,498,494 A | 3/1996 | Takeuchi et al. | 429/219 |
| 5,545,497 A | 8/1996 | Takeuchi et al. | 429/219 |
| 5,558,680 A | 9/1996 | Takeuchi et al. | 29/623.1 |
| 5,670,276 A | 9/1997 | Takeuchi et al. | |
| 5,695,892 A | 12/1997 | Leising et al. | 429/219 |
| 5,895,733 A | 4/1999 | Crespi et al. | 429/219 |
| 5,955,218 A | 9/1999 | Crespi et al. | 429/219 |
| 6,171,729 B1 * | 1/2001 | Gan et al. | 429/231.95 |

FOREIGN PATENT DOCUMENTS

| EP | 0478303 A2 | 4/1992 |
|---|---|---|
| EP | 0618630 A1 | 10/1994 |

OTHER PUBLICATIONS

Abstract No. 125, Effect of Silver Content On The Performance Of Primary Lithium/Silver Vanadium Oxide Batteries, E. S. Takeuchi and P. Keister.

Journal of Power Sources, 21 (1987) 133–141—Lithium/Silver Vanadium Oxide Batteries With Various Silver To Vanadium Ratios, Esther Sans Takeuchi and Pamela Piliero.

Solid–State Cathode Materials For Lithium Batteries: Effect Of Synthesis Temperature on the Physical and Electrochemical Properties of Silver Vanadium Oxide, Randolph A. Leising and Esther Sans Takeuchi.

Solid–State Synthesis and Characterization of Silver Vanadium Oxide for Use as a Cathode Material for Lithium Batteries, Randolph A. Leising and Esther Sans Takeuchi.

* cited by examiner

*Primary Examiner*—Laura Weiner
(74) *Attorney, Agent, or Firm*—Michael F. Scalise

(57) ABSTRACT

A method for synthesizing a mixture of $\epsilon$-SVO ($Ag_2V_4O_{11}$) and $\gamma$-SVO ($Ag_{1.6}V_4O_{10.8}$) by a two-step raw materials mixing process, is described. $\gamma$-SVO is the preferred SVO in terms of electrochemical performance, such as reduced Rdc growth and reduced or eliminated voltage delay. On the other hand, $\epsilon$-SVO has slightly higher volumetric capacity than y-SVO. $AgVO_3$ is an undesirable component in Li/SVO cell cathodes because it causes increased Rdc growth and larger voltage delay in comparison to the pure product materials. According to the present invention, a mixture of $\epsilon$-SVO (0–100%)+$\gamma$-SVO (100–0%) as a cathode active material in lithium cells is preferred.

39 Claims, 5 Drawing Sheets

SILVER VANADIUM OXIDE CATHODE MATERIAL FOR HIGH DISCHARGE RATE LITHIUM CELLS

CROSS REFERENCE TO RELATED APPLICATION

The present application claims priority based on provisional application Serial No. 60/195,006, filed Apr. 6, 2000.

BACKGROUND OF THE INVENTION

1. Field of the Invention

The present invention generally relates to the conversion of chemical energy to electrical energy. More particularly, this invention relates to a cathode material for a lithium electrochemical cell and, in particular, to a silver vanadium oxide cathode used in a lithium electrochemical cell designed for high current pulse discharge applications.

2. Prior Art

Silver vanadium oxide (SVO) cathode active materials can be synthesized from silver-containing compounds such as Ag, AgI, AgO, $Ag_2O$, $AgNO_3$, $AgNO_2$, $AgCO_3$, $AgVO_3$, $Ag(CH_3CO_2)$, and mixtures thereof, and from vanadium-containing compounds such as $AgVO_3$, $V_2O_5$, $V_2O_4$, $V_2O_{31}$, $V_3O_7$, $V_4O_9$, $V_6O_{13}$, $NH_4VO_3$, and mixtures thereof under thermal treatment. Historically, two types of reactions are described. The first type is best described in U.S. Pat. Nos. 4,310,609 to Liang et al. and 5,545,497 to Takeuchi et al., which are assigned to the assignee of the present invention and incorporated herein by reference, as a decomposition reaction in which one or both of the starting materials is decomposed before formation of SVO. The second type is described in U.S. Pat. Nos. 5,221,453 to Crespi and 5,895,733 to Crespi et al. as a combination reaction in which the only elements involved in the reaction are silver, vanadium and oxygen. In all of the above patents, the starting materials are mixed in a predetermined stoichiometry before thermal treatment begins. The stoichiometric elemental ratio of silver to vanadium is calculated to be the ratio of silver to vanadium in the final SVO product. For example, if the final desired product is $Ag_2V_4O_{11}$, the initial mixture of the silver-containing compound and the vanadium-containing compound is adjusted to a silver to vanadium molar ratio of 1 to 2. Therefore, the reactions described in all of the above patents are characterized as "one step raw materials mixing" reactions.

In both decomposition and combination reactions, the reactions are known to proceed in solid state or the reactions proceed in an inhomogeneous state to begin with. From a chemical point of view, the inhomogeneous reactions occur at the interface and they generally take longer than the homogeneous reactions to reach completion. In many cases, the end product is also inhomogeneous in terms of the chemical composition throughout the bulk of the material. Completeness of the reaction is dependent on the reaction temperature, reaction time, how well the reactive raw materials are mixed, the raw material particle size, and the like. Therefore, even though the correct stoichiometric ratio of silver to vanadium is used in the raw material mixture, the reaction product often ends up being a mixture of the desired product and several reaction intermediates.

For example, when SVO with a stoichiometry of Ag:V=2:4 is synthesized from $AgNO_3$ and $V_2O_5$ at 375° C., as described in the above-referenced patent to Liang et al., a product material with at least three components is obtained. The three components are distinguishable by differential thermal analysis (DTA) to be $AgVO_3$ (silver rich component), $Ag_2V_4O_{11}$ ($\epsilon$-phase SVO, the desired product) and $Ag_{1.6}V_4O_{10.8}$ ($\gamma$-phase SVO, silver deficient component).

Although this mixture is successfully used in the construction of Li/SVO cells for implantable defibrillator applications, it is difficult to control the quality of the synthesized material. The relative ratio of each component in the product active material changes based on reaction conditions such as starting material particle size, how well the materials are mixed, reaction batch size, reaction temperature, type of furnace used, reaction time, and the like. This difficulty is manifested in Li/SVO cell performance variations from one lot to the next.

One way to minimize component variations from lot to lot is, in theory, to ensure that the reaction proceeds to completion by either prolonging reaction time or increasing reaction temperature. Prolonging reaction time is undesirable due to its lack of efficiency as a production process. Increasing reaction temperature has been used as an alternative means of synthesizing improved SVO [R. A. Leising, E. S. Takeuchi, Chem. of Material, 5, 738–42, (1993); R. A. Leising and E. S. Takeuchi, Chem. of Material, 6, 489–95, (1994); and U.S. Pat. Nos. 5,895,733 and 5,955,218, both to Crespi at al.].

Nonetheless, achievement of a single component or pure phase SVO has not been demonstrated in any of the above-referenced prior art. In every case, a higher reaction temperature results in a more highly crystalline product material. In fact the X-ray powder diffraction patterns for synthesized SVO shown in FIGS. 2A, 2B and 2C of U.S. Pat. No. 5,895,733 to Crespi et al., in FIGS. 15A, 16A and 17 of U.S. Pat. No. 5,955,218 to Crespi et al. and by Leising et al. in FIGS. 3 and 4 in Chem. of Material, 6, 489–95, (1994) are essentially identical or very similar. However, as demonstrated by Leising et al., these materials contain multiple phases of components, such as $Ag_2V_4O_{11}$ ($\epsilon$-SVO) and $Ag_{1.6}V_4O_{10.8}$ ($\gamma$-SVO) [FIG. 2 in Chem. of Material, 6, 489–95, (1994)].

Although several SVO phases have been discovered and extensively studied, it is believed that the prior art has not demonstrated or suggested the use a single phase SVO material in an electrochemical cell, especially a lithium cell, for implantable cardiac defibrillator applications. In other words, the stoichiometry of raw materials used in a particular synthesis cannot be used as an indicator that the product SVO material is in its pure phase. Therefore, there is still a need to fully understand the chemical pathways which produce SVO and to improve the chemical system to provide a desired single phase or nearly pure phase (enriched) active material.

SUMMARY OF THE INVENTION

According to the present invention, a pure phase SVO material, for example $\gamma$-SVO, is provided as well as an enriched $\epsilon$-SVO material. These materials are in comparison to those of the prior art which include some of the starting materials in the product compound. The present invention is also directed to a study of the discharge characteristics of the enriched $\epsilon$-SVO and the pure $\gamma$-SVO. Finally, a synthesis technique is disclosed for coating enriched $\epsilon$-SVO with pure $\gamma$-SVO. In the present synthetic methodologies, the advantage of each constituent in the product SVO material is maintained while suppressing their disadvantages.

These and other aspects of the present invention will become increasingly more apparent to those skilled in the art

DETAILED DESCRIPTION OF THE PREFERRED EMBODIMENTS

As used herein, the term "pulse" means a short burst of electrical current of a greater amplitude than that of a prepulse current immediately prior to the pulse. A pulse train consists of at least two pulses of electrical current delivered in relatively short succession with or without open circuit rest between the pulses. A typical pulse current ranges from about 15.0 mA/cm² to about 30.0 mA/cm².

Figure 1:
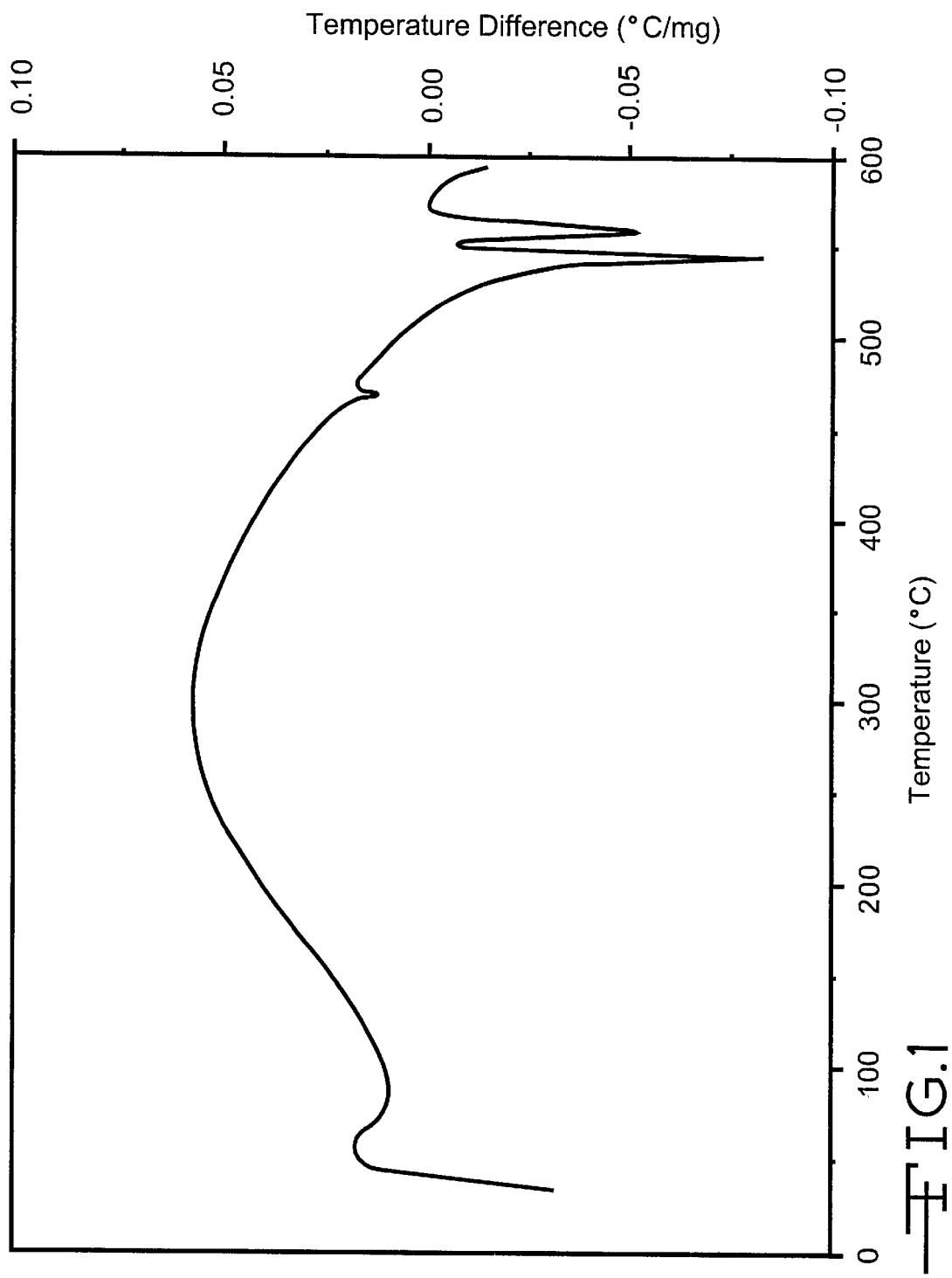
FIG. 1 is a DTA graph of $Ag_2V_4O_{11}$ synthesized in a decomposition reaction of $AgNO_3$ and $V_2O_5$ heated to a final temperature of <380° C.

In SVO synthesis, five silver-containing vanadium oxide compounds have been identified. As shown in FIG. 1 of U.S. Pat. No. 5,545,497 to Takeuchi et al., which is assigned to the assignee of the present invention and incorporated herein by reference, they are: silver vanadate ($AgVO_3$), β-SVO ($Ag_{0.7}V_4O_{10.35}$), δ-SVO ($Ag_{1.36}V_2O_{10}$), γ-SVO ($Ag_{1.6}V_4O_{10.8}$), and ε-SVO ($Ag_2V_4O_{11}$). Since each of these compounds have chemically distinct molecular formulas, their chemical and electrochemical properties are, consequently, different. Therefore, variations in Li/SVO cell performance are correlated to the chemical composition of the SVO cathode active materials used in a particular cell. Unfortunately, the chemical and electrochemical properties of each component have not been fully characterized and systematically studied. The present invention discloses the first systematic study on this issue.

EXAMPLE I

SVO Material Synthesized Under a Temperature <380° C.

SVO material with a stoichiometry of $Ag_2V_4O_{11}$ was synthesized by mixing $AgNO_3$ and $V_2O_5$ in a Ag:V molar ratio of 1:2. The mixture was heated at 230° C. for 30 minutes, followed by heating at 260° C. for 2 hours, followed by heating at 300° C. for 15 hours. The resulting material was re-mixed and heated at 375° C. for 27 hours. This SVO material having a stoichiometry of $Ag_2V_4O_{11}$ was analyzed by DTA as shown in FIG. 1 (scan rate: 10° C./min). Three endothermic peaks are clearly detected. The peak at 468° C. is identified as $AgVO_3$. The peak at 544° C. is identified as ε-SVO with a molecular formula of $Ag_2V_4O_{11}$. The ε-SVO material is the desired product because it has the same stoichiometry as the starting materials. The peak at 558° C. is identified as γ-SVO with a molecular formula of $Ag_{1.6}V_4O_{10.8}$. Therefore, the DTA data suggests that the product SVO derived from the above synthesis protocol is a mixture of at least three components. Although the overall stoichiometry is $Ag_2V_4O_{11}$ the material is not chemically pure.

EXAMPLE II

Synthesis of Improved SVO Under a Temperature ≦460° C.

Figure 2:
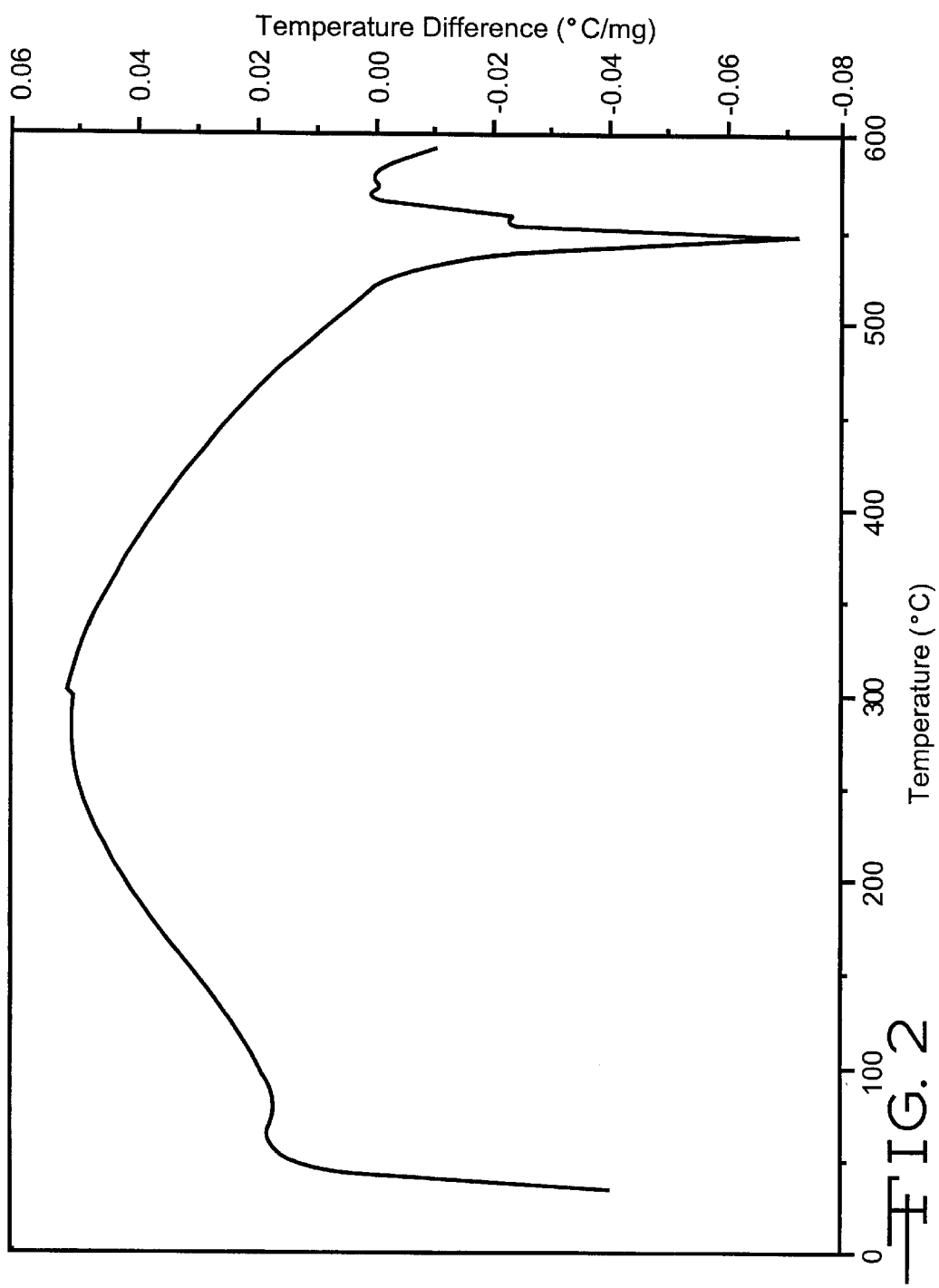
FIG. 2 is a DTA graph of $Ag_2V_4O_{11}$ synthesized in a decomposition reaction of $AgNO_3$ and $V_2O_5$ heated to a final temperature of ≦460° C.

SVO material with a stoichiometry of $Ag_2V_4O_{11}$ was synthesized by mixing $AgNO_3$ and $V_2O_5$ in a Ag:V molar ratio of 1:2. The mixture was heated at 230° C. for 30 minutes, followed by heating at 260° C. for 2 hours, followed by heating at 300° C. for 15 hours. The resulting material was re-mixed and heated at 450° C. for 72 hours. This SVO material having a stoichiometry of $Ag_2V_4O_{11}$ was analyzed by DTA as shown in FIG. 2 (scan rate: 10° C./min). Two endothermic peaks are observed: 546° C. for ε-SVO and 557° C. for γ-SVO. Compared to FIG. 1, the peak corresponding to $AgVO_3$ is eliminated. However, the peaks corresponding to ε-SVO and γ-SVO are still present.

EXAMPLE III

Effect of $AgVO_3$ on Electrochemical Cell Performance

Eight Li/SVO electrochemical cells were constructed in the following manner. Lithium anode material was pressed on a nickel current collector screen and cathode material was pressed on a titanium current collector screen. A prismatic cell stack assembly configuration with two layers of microporous membrane polypropylene separator sandwiched between the anode and the cathode was prepared. The electrode assembly was then hermetically sealed in a stainless steel casing in a case negative configuration. The cells were then activated with an electrolyte of 1.0M $LiAsF_6$/PC:DME=1:1.

Four of the cells contained a cathode active material synthesized according to Example I (group 1) and four of the cells contained a cathode active material synthesized according to Example II (group 2). After burn-in and acceptance pulse testing, which depletes the cells of about 1% of their theoretical capacity, these cells were discharged under a 16.5 kΩ load interrupted every 60 days by a pulse train. The pulse trains consisted of four 10 second pulses having a current density of 22.2 mA/cm² with a 15 second rest between pulses. The average results from each cell group for the initial six pulse trains are summarized in Table 1.

TABLE 1

| Pulse Train (% DOD) | Group | Pprel (V) | P1min (V) | P4min (V) |
|---|---|---|---|---|
| 1 (1.22%) | 1 | 3.232 | 2.582 | 2.546 |
| 1 (1.22%) | 2 | 3.221 | 2.551 | 2.506 |
| 2 (14.05%) | 1 | 3.180 | 2.571 | 2.463 |
| 2 (13.99%) | 2 | 3.158 | 2.533 | 2.462 |
| 3 (27.05%) | 1 | 2.956 | 2.459 | 2.368 |
| 3 (26.88%) | 2 | 2.917 | 2.438 | 2.365 |
| 4 (38.02%) | 1 | 2.639 | 2.033 | 2.223 |
| 4 (37.85%) | 2 | 2.664 | 2.078 | 2.261 |
| 5 (49.08%) | 1 | 2.542 | 1.769 | 2.041 |
| 5 (49.01%) | 2 | 2.561 | 1.991 | 2.183 |
| 6 (59.77%) | 1 | 2.515 | 1.576 | 1.878 |
| 6 (59.78%) | 2 | 2.540 | 1.670 | 2.008 |

The data in Table 1 demonstrates that the group 1 cells containing a cathode active material synthesized at a relatively low temperature of 375° C. presented higher pre-pulse potentials and higher pulse minimum potentials than that of the group 2 cells at an early stage of cell discharge (pulse trains 1 to 3). However, this trend was completely reversed in pulse trains 4 to 6. Therefore, the advantage of eliminating AgVO$_3$ in the cathode active material helps to maintain higher potentials and lower Rdc in later stages of discharge (at >30% DOD). The problem is that at beginning of discharge, (at <30% DOD), cell Rdc is larger.

Although the cathode active material synthesized in Example II is considered to be an improved material over the SVO synthesized in Example I, it is, nonetheless, a mixture of ε-SVO and γ-SVO, as demonstrated by the DTA analysis. From the results of this example, it is still unknown which SVO compound (ε-SVO or γ-SVO) is providing the beneficial effect as well as the detrimental effect.

Examples I to III demonstrate that the improvements in SVO syntheses described in the above-referenced prior art reports and patents are not entirely due to crystallinity changes. It is believed that chemical composition changes from the starting constituents synthesized to the product SVO material probably play an even bigger role. This has not been described by the prior art.

EXAMPLE IV

Figure 3:
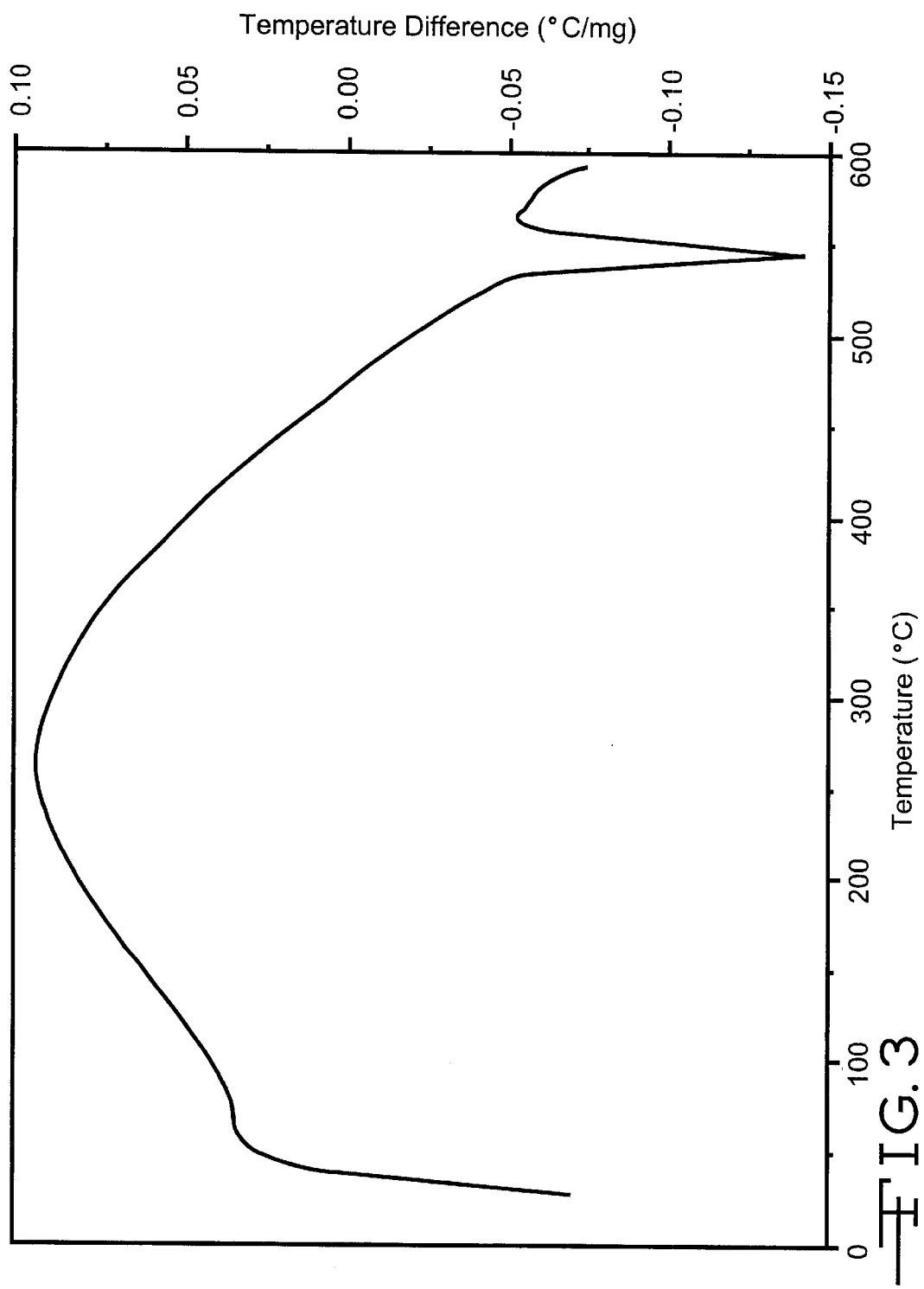
FIG. 3 is a DTA graph of ε-SVO and γ-SVO synthesized in a decomposition reaction of $AgNO_3$ and $V_2O_5$ heated to a final temperature of ≦510° C.

Synthesis of Enriched ε-Phase SVO Having a Molecular Formula of Ag$_2$V$_4$O$_{11}$ Another SVO sample was synthesized from AgNO$_3$ and V$_2$O$_5$ mixed in a stoichiometry ratio of Ag:V=1:2. The mixture was heated in an oven at 250° C. for 30 minutes followed by heating at 375° C. for 6 hours. The resulting material was mechanically mixed and heated at 500° C. for 16 hours. After re-mixing the material, it was heated at 500° C. for another 72 hours. Dark-grey crystalline material was obtained. This material was then analyzed by DTA, as shown in FIG. 3 (scan rate: 10° C./min). Similar to the material shown in FIG. 2, the AgVO$_3$ peak is eliminated. However, ε-SVO (546° C.) and γ-SVO (554° C.) are still present. The thermal peak for γ-SVO is much smaller, but still detectable as the shoulder of the thermal peak of the ε-SVO. Nevertheless, the material synthesized at 500° C. is considered to be enriched ε-SVO. In this example, enriched ε-SVO is defined as a material completely devoid of the starting vanadium-containing compound, i.e., V$_2$O$_5$, and the starting silver-containing compound, i.e., AgNO$_3$. This holds true for the other starting materials listed in the Prior Art section.

EXAMPLE V

Figure 4:
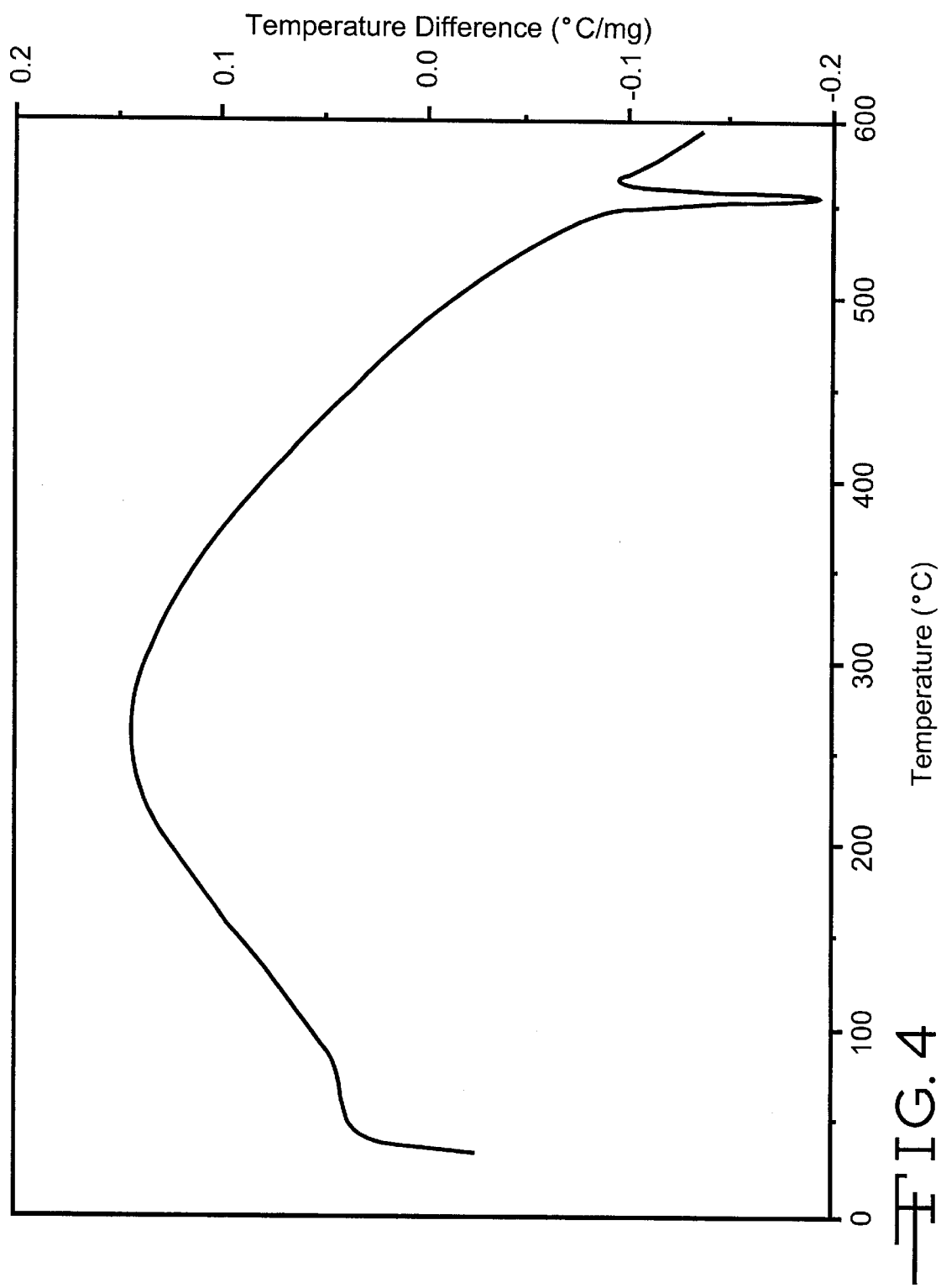
FIG. 4 is a DTA graph of $Ag_{1.6}V_4O_{10.8}$.

Synthesis of Pure γ-Phase SVO Having a Molecular Formula of Ag$_{16}$V$_4$O$_{10.8}$ AgNO$_3$ and V$_2$O$_5$ were mixed in a stoichiometry ratio of Ag:V=1.6:4. The mixture was heated in an oven at 250° C. for 2 hours followed by heating at 300° C. for 20 hours. The resulting material was mechanically mixed and heated at 500° C. for 24 hours. Bluish-dark powder material was obtained. This material was then analyzed by DTA, as shown in FIG. 4 (scan rate: 10° C./min). Only one endothermic peak is seen in the DTA analysis. The peak is attributed to the thermal phase transition of γ-SVO (554° C.). This example demonstrates that a pure (100%) single phase γ-SVO can be obtained by synthesizing the material at 500° C.

EXAMPLE VI

Effect of ε-SVO and γ-SVO on Electrochemical Cell Performance (Up to 35% DOD)

Six Li/SVO cells were constructed in the same manner as described in Example III. Three cells were constructed having cathode active material synthesized according to Example IV (group 3) and three cells were constructed having cathode active material synthesized according to Example V (group 4). After burn-in and acceptance pulse testing, these cells were discharged under a 22.1 kΩ load interrupted every 36 days by a pulse train. The pulse train consisted of four 10 second pulses having a current density of 22.2 mA/cm$^2$ with a 15 second rest between pulses. The average results from each cell group for the initial six pulse trains are summarized in Table 2.

TABLE 2

| Pulse Train (% DOD) | Group | Ppre1 (V) | P1min (V) | P4min (V) |
|---|---|---|---|---|
| 1 (1.09%) | 3 | 3.196 | 2.525 | 2.479 |
| 1 (1.09%) | 4 | 3.402 | 2.596 | 2.443 |
| 2 (7.38%) | 3 | 3.157 | 2.555 | 2.556 |
| 2 (7.52%) | 4 | 3.103 | 2.486 | 2.401 |
| 3 (13.59%) | 3 | 3.091 | 2.560 | 2.493 |
| 3 (13.57%) | 4 | 2.967 | 2.503 | 2.445 |
| 4 (19.68%) | 3 | 2.992 | 2.467 | 2.407 |
| 4 (19.51%) | 4 | 2.936 | 2.519 | 2.468 |
| 5 (25.88%) | 3 | 2.925 | 2.444 | 2.378 |
| 5 (25.23%) | 4 | 2.879 | 2.527 | 2.481 |
| 6 (31.37%) | 3 | 2.830 | 2.320 | 2.317 |
| 6 (31.07%) | 4 | 2.817 | 2.472 | 2.427 |

The data in Example VI illustrates the effect ε-SVO and γ-SVO have on the long term performance of a Li/SVO cell at less than 35% DOD. Except for pulse train 1, the group 3 cells with γ-SVO presented lower pre-pulse potentials than the group 4 cells primarily containing ε-SVO material. In addition, the group 3 cells presented higher pulse 4 minimum potentials in pulse trains 1 to 3 (up to about 14% DOD). However, the group 4 cells afforded significantly higher pulse 1 minimum potentials in pulse trains 1, 4, 5 and 6 and significantly higher pulse 4 minimum potentials in pulse trains 4 to 6.

EXAMPLE VII

Effect of ε-SVO and γ-SVO on Electrochemical Cell Performance (At>35% DOD)

Six Li/SVO cells were constructed in the same manner as described in Example III. Three cells were built having a cathode active material synthesized according to Example IV (group 5) and three cells were built having a cathode active material synthesized according to Example V (group 6). After these cells were pre-discharge to remove about 29.4% of their theoretical capacity, they were discharged under a 22.1 kΩ load interrupted every 36 days by pulse trains consisting of four 10 second pulses having a current density of 22.2 mA/cm$^2$ with a 15 second rest between pulses. The average results of the initial six pulse trains are summarized in Table 3.

TABLE 3

| Pulse Train (% DOD) | Group | Ppre1 (V) | P1min (V) | P4min (V) |
|---|---|---|---|---|
| 1 (30.46%) | 5 | 3.075 | 2.669 | 2.535 |
| 1 (30.45%) | 6 | 2.843 | 2.559 | 2.506 |
| 2 (36.21%) | 5 | 2.794 | 2.373 | 2.348 |
| 2 (36.01%) | 6 | 2.794 | 2.491 | 2.440 |
| 3 (41.82%) | 5 | 2.607 | 1.993 | 2.149 |
| 3 (41.72%) | 6 | 2.731 | 2.375 | 2.321 |
| 4 (47.78%) | 5 | 2.589 | 1.971 | 2.069 |

TABLE 3-continued

| Pulse Train (% DOD) | Group | Ppre1 (V) | P1min (V) | P4min (V) |
|---|---|---|---|---|
| 4 (47.87%) | 6 | 2.648 | 2.266 | 2.234 |
| 5 (53.20%) | 5 | 2.578 | 1.934 | 2.037 |
| 5 (53.36%) | 6 | 2.598 | 2.176 | 2.172 |
| 6 (58.57%) | 5 | 2.554 | 1.888 | 1.986 |
| 6 (58.78%) | 6 | 2.593 | 2.118 | 2.121 |

The data in this example illustrates that the group 6 cells with γ-SVO presented significantly better discharge performance than that of the group 5 cells having ε-SVO in all pulse trains, except pulse train 1.

Examples VI and VII demonstrate that Li/SVO cells with γ-phase SVO provide better overall long term pulse performance than similarly constructed cells with ε-phase SVO.

EXAMPLE VIII

Gravimetric Capacity Calculation (Ah/g)

In Examples VI and VII, the cells were constructed containing the same amount of ε-SVO (from Example IV) and γ-SVO (from Example V), by weight. Thus, the above data analysis is purely based on gravimetric comparisons. The theoretical gravimetric capacities of ε-SVO and γ-SVO are calculated as shown below.

| ε-SVO | $Ag_2V_4O_{11}$ + 7 Li (MW 595.50) Oxidation State Ag: +1 V: +5 O: −2 Li: 0 | → | $Li_7Ag_2V_4O_{11}$ (MW 644.09) Oxidation State Ag: 0 V: +3.75 O: −2 Li: +1 |
|---|---|---|---|
| γ-SVO | $Ag_{1.6}V_4O_{10.8}$ + 6.6 Li (MW 549.15) Oxidation State Ag: +1 V: +5 O: −2 Li: 0 | → | $Li_{6.6}Ag_{1.6}V_4O_{10.8}$ (MW 594.96) Oxidation State Ag: 0 V: +3.75 O: −2 Li: +1 |

Based on the molecular weight of the competing SVO materials, γ-SVO has 2.24% more gravimetric capacity (Ah/g) than that of ε-SVO. For implantable medical device applications, the size of the device and, consequently, the size of the electrochemical cell power source is a very important factor. Therefore, the volumetric energy density of each active component in a Li/SVO cell is more important than the gravimetric energy density.

EXAMPLE IX

Volumetric Capacity Calculation (Ah/ml)

SVO materials synthesized from Examples IV and V were mixed with binder and conductive carbonaceous additives. The final cathode mixes had, by weight, 94% active SVO material, 3% binder and 3% conductive additives. 1.0 gram of each cathode mix was pressed at 6 tons/cm² into a pellet having an area of 5.3 cm². The thickness of the pellet was measured. The relative thickness and the relative volumetric density of the competing cathode materials are shown in Table 4.

TABLE 4

| SVO Mix | SVO Phase | Relative Thickness | Relative Density |
|---|---|---|---|
| 94% Active | ε-SVO (Ex. IV) | 1.00 | 100.00% |
| 94% Active | γ-SVO (Ex. V) | 1.07 | 93.46% |

The results in Table 4 show that γ-SVO has a lower volumetric density than that of ε-SVO by about 6.54%. Thus, by combining the data from Examples VIII and IX, the relative volumetric capacities are calculated to be ε-SVO vs. γ-SVO=100.0% vs. 95.6%.

The above examples demonstrate that the long term performance of SVO cells is highly dependent on the SVO chemical composition. Li/SVO cells containing a cathode active material with the high silver content component $AgVO_3$ performed poorly compared to Li/SVO cells containing only ε-SVO or γ-SVO. In addition, Li/SVO cells with pure γ-SVO exhibited superior overall long term performance in comparison to Li/SVO cells containing only ε-SVO in terms of lower Rdc and Rdc growth. Nevertheless, Li/SVO cells with γ-SVO cathode active material provide lower theoretical volumetric capacity than Li/SVO cells with ε-SVO cathode active material based on the data in Examples VIII and IX. Therefore, the beneficial effect of pure γ-phase SVO is partially cancelled by the detrimental effect of its low volumetric density.

New Process for Making Improved SVO Cathode Material

According to the present invention, it is believed that neither the ε-SVO or the γ-SVO materials are sufficient to maintain the best characteristics in all discharge areas, such as lower Rdc and Rdc growth, minimum or no voltage delay, high gravimetric and volumetric capacities and energy densities. In order to maintain the advantage of lower Rdc and Rdc growth exhibited by γ-SVO and at the same time maintain the advantage of high volumetric capacity of ε-SVO, the present invention uses a mixture of these SVO materials.

Instead of making the mixed phase material by starting with the stoichiometry of an Ag to V ratio from 2.0:4.0 for ε-SVO to 1.6:4.0 for γ-SVO, the respective phases of SVO are individually prepared according to the synthesis techniques set forth in Examples IV and V. Then, the pure ε-SVO and the pure phase γ-SVO materials are mixed together in a desired weight ratio to generate the final stoichiometry formula $Ag_xV_4O_y$, where $1.6 \leq x \leq 2.0$ and $10.8 \leq y \leq 11.0$. By making the cathode active material this way, the chemical content of the material is under strict control. Since the electrochemical properties of each individual SVO component are well known, the performance variation of cells with the present mixed phase SVO cathode active material are effectively minimized and predictable.

Another method for utilizing the beneficial characteristics of the high volumetric energy density of ε-SVO and the good electrochemical properties of γ-SVO is to coat ε-SVO particles with γ-SVO layers. By doing this, the ε-SVO particle surface is primarily covered by γ-SVO, and the exposure of ε-SVO to electrolyte minimized. This goal cannot be achieved using the "one step raw material mixing" processes described in the prior art. In addition, since the synthetic reaction is a solid state reaction, inhomogeneous mixing may result in the presence of $AgVO_3$ in addition to ε-SVO and γ-SVO. As previously discussed, $AgVO_3$ is detrimental to the long term performance of a Li/SVO cell.

To avoid this problem, a "two step raw material mixing" process according to the present invention is utilized. In this process, a silver rich SVO material, such as ε-SVO (A %)+γ-SVO (B %) where $100 \geq A \geq 0$, $0 \leq B \leq 100$, and A+B= 100, is initially synthesized. Then, a vanadium containing compound is added to the silver rich SVO material to obtain a product with a final stoichiometry of $Ag_xV_4O_y$ where $1.6 \leq x \leq 2.0$ and $10.8 \leq y \leq 11$. It is hypothesized that when the vanadium-containing compound is added to the silver rich SVO material under thermal treatment, the added vanadium-compound reacts with the silver rich SVO material on the particle interface to initially form silver deficient SVO, such as $Ag_{0.7}V_4O_{5.35}$ (β-SVO) or $Ag_{1.6}V_4O_{10.8}$ (γ-SVO). This silver deficient SVO forms on the particle surface, covering the silver rich SVO components. By controlling the reaction time, reaction temperature, the amount of added vanadium-containing compound and the type of the added vanadium compound, an ε-SVO and γ-SVO mixed phase material is obtained with enriched γ-SVO formed on the surface of the cathode particles.

EXAMPLE X

SVO Synthesis Using a Two Step Raw Materials Mixing Process

Step 1, Raw Materials Mixing:

$AgNO_3$ and $V_2O$, were mixed in an Ag:V molar ratio of 1:2. The mixture was heated at 230° C. for 30 minutes, followed by heating at 260° C. for 2 hours, followed by heating at 300° C. for 15 hours. The resulting material had a stoichiometry formula of $Ag_2V_4O_{11}$.

Step 2, Raw Material Mixing

Figure 5:
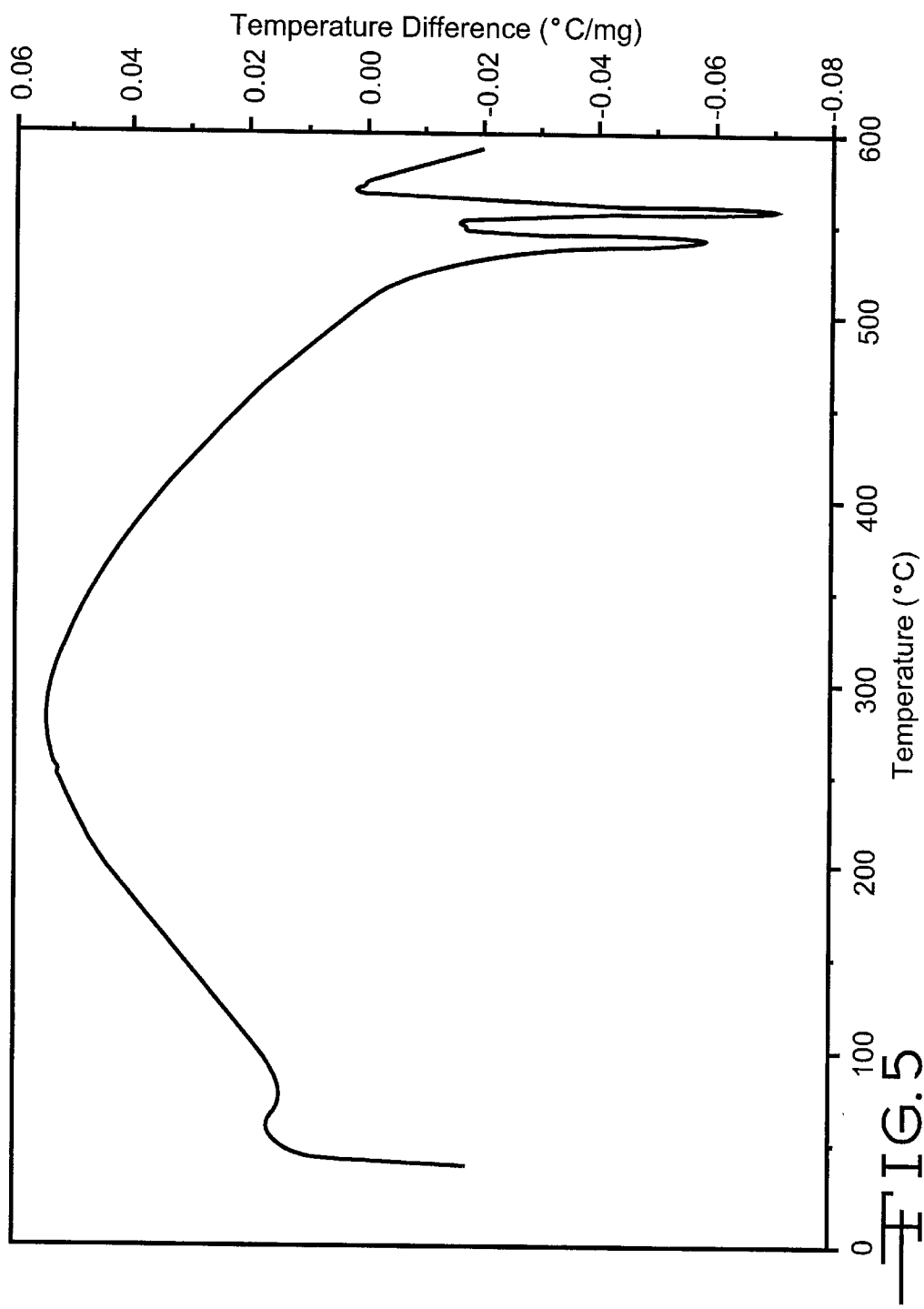
FIG. 5 is a DTA graph of 55% ε-SVO and 45% γ-SVO.

The above material from step 1 having an empirical formula of $Ag_2V_4O_{11}$ was mechanically mixed with $V_2O_5$ fine powders. The amount of $V_2O_5$ added was calculated based on the final empirical formula of $Ag_{1.82}V_4O_{10.91}$. After mixing the materials thoroughly, the mixture was heated at 450° C. for 48 hours. Dark-grey crystalline material was obtained. Based on the DTA analysis shown in FIG. 5, the material contains ε-SVO having an endothermic peak at 542° C. and γ-SVO having an endothermic peak at 558° C. If, as expected, the mixture contains only ε-SVO and γ-SVO, the percentage of each component is calculated to be about 55% ε-SVO and about 45% γ-SVO, by weight.

Example X demonstrates a new "two step mixing" method of synthesizing cathode active material having only ε-SVO and γ-SVO as its final components This mixed material has a stoichiometry of $Ag_xV_4O_y$ where $1.6 \leq x \leq 2.0$ and $10.8 \leq y \leq 11$.

EXAMPLE XI

Cell Testing Using Cathode Material Synthesized From A Two Step Raw Material Mixing Process Eight Li/SVO cells were constructed in the same manner as described in Example II. Four cells were constructed having a cathode active material from Example II (group 7, one step raw materials mixing process) and four cells were constructed having a cathode active material from Example X (group 8, two step raw materials mixing process). After burn-in and acceptance pulse testing, these cells were discharged under a 16.5 kΩ load interrupted every 60 days by pulse trains consisting of four 10 second pulses having a current density of 22.2 mA/cm² with a 15 second rest between pulses. The average results from the initial six pulse trains are summarized in Table 5.

TABLE 5

| Pulse Train (% DOD) | Group | Ppre1 (V) | P1min (V) | P4min (V) |
|---|---|---|---|---|
| 1 (1.22%)   | 7 | 3.221 | 2.551 | 2.506 |
| 1 (1.22%)   | 8 | 3.235 | 2.600 | 2.533 |
| 2 (13.99%)  | 7 | 3.158 | 2.533 | 2.462 |
| 2 (14.02%)  | 8 | 3.162 | 2.582 | 2.478 |
| 3 (26.87%)  | 7 | 2.917 | 2.438 | 2.365 |
| 3 (26.91%)  | 8 | 2.914 | 2.480 | 2.413 |
| 4 (37.85%)  | 7 | 2.664 | 2.078 | 2.261 |
| 4 (37.96%)  | 8 | 2.708 | 2.270 | 2.268 |
| 5 (49.00%)  | 7 | 2.561 | 1.991 | 2.183 |
| 5 (49.24%)  | 8 | 2.584 | 2.062 | 2.174 |
| 6 (59.78%)  | 7 | 2.540 | 1.670 | 2.008 |
| 6 (60.07%)  | 8 | 2.543 | 1.812 | 1.992 |

The data presented in Table 5 illustrates the beneficial effect of a cathode active material synthesized from a two step raw materials mixing process according to the present invention. Higher or similar pre-pulse potentials were maintained throughout the test for the group 8 cells relative to that of the group 7 cells. This effect is a very positive improvement in terms of increasing energy density since energy density is proportional to the discharge voltage. The other advantage attributed to the group 8 cells vs. the group 7 cells is that the former cells had significantly higher pulse 1 minimum potentials in all pulse trains. The pulse 4 minimum potentials of the group 8 cells were also higher than those of the group 7 cells in pulse trains 1 to 4.

Example XI demonstrated the good long term performance of Li/SVO cells utilizing an SVO cathode active material synthesized according to the "two step mixing" process of the present invention.

It is appreciated that various modifications to the present inventive concepts described herein may be apparent to those of ordinary skill in the art without disparting from the spirit and scope of the present invention as defined by the herein appended claims.

What is claimed is:

1. An electrochemical cell comprising an anode, a cathode, and an electrolyte operatively associated with the anode and the cathode, the improvement in the cell comprising:

the cathode of a cathode active material comprising a mixture of a first cathode active material and a second cathode active material, wherein the first cathode active material is a reaction product of at least a first silver-containing material mixed with at least a first vanadium-containing material in a stoichiometric reaction ratio of Ag:V of substantially 1:2 to provide ε-silver vanadium oxide (ε-SVO) having an empirical formula of ($Ag_2V_4O_{11}$) and wherein the second cathode active material is a reaction product of at least a second silver-containing material mixed with at least a second vanadium-containing material in a stoichiometric reaction ratio of Ag:V of substantially 0.8:2 to provide γ-silver vanadium oxide (γ-SVO) having an empirical formula of ($Ag_{1.6}V_4O_{10.8}$) and wherein the ε-SVO and the γ-SVO are then mixed together to provide the cathode active material having a stoichiometric formula $Ag_xV_4O_y$ with $1.69<x<2.0$ and $10.8<y<11.0$ and wherein the cathode active material is substantially devoid of unreacted starting materials.

2. The electrochemical cell of claim 1 wherein the cathode active material is a mixture of about 55% ε-SVO and about 45% γ-SVO, by weight.

3. The electrochemical cell of claim 1 wherein the first and second silver-containing materials are selected from the group consisting of Ag, AgI, AgO, $Ag_2O$, $AgNO_3$, $AgNO_2$, $AgCO_3$, $AgVO_3$, $Ag(CH_3CO_2$, and mixtures thereof.

4. The electrochemical cell of claim 1 wherein the first and second vanadium-containing materials are selected from the group consisting of $AgVO_3$, $V_2O_5$, $V_2O_4$, $V_2O_3$, $V_3O_7$, $V_4O_9$, $V_6O_{13}$, $NH_4VO_3$, and mixtures thereof.

5. The electrochemical cell of claim 1 wherein the ε-SVO ($Ag_2V_4O_{11}$) is characterized as having been prepared from $AgNO_3$ and $V_2O_5$ mixed in a stoichiometric ratio of Ag:V of 1:2 and heated to a final temperature of about 500° C.

6. The electrochemical cell of claim 1 wherein the γ-SVO ($Ag_{1.6}V_4O_{10.8}$) is characterized as having been prepared from $AgNO_3$ and $V_2O_5$ mixed in a stoichiometric ratio of Ag:V of 1.6:4 and heated to a final temperature of about 500° C.

7. The electrochemical cell of claim 1 wherein the cell is dischargeable to deliver a current pulse of about 15.0 $mA/cm^2$ to 30.0 $mA/cm^2$.

8. The electrochemical cell of claim 1 wherein the anode comprises lithium.

9. The electrochemical cell of claim 1 wherein the electrolyte is a nonaqueous liquid electrolyte.

10. The electrochemical cell of claim 1 wherein the electrolyte is $LiAsF_6$ in a 50:50, by volume, mixture of propylene carbonate and dimethoxyethane.

11. The electrochemical cell of claim 1 wherein the first and second silver-containing materials are the same or different and wherein the first and second vanadium-containing materials are the same or different.

12. A method for providing a cathode active material, comprising the steps of:
a) reacting at least a first silver-containing material mixed with at least a first vanadium-containing material in a stoichiometric reaction ratio of Ag:V of substantially 1:2 thereby providing a first cathode active material as ε-silver vanadium oxide (ε-SVO) having an empirical formula of ($Ag_2V_4O_{11}$);
b) reacting at least a second silver-containing material mixed with at least a second vanadium-containing material in a stoichiometric reaction ratio of Ag:V of substantially 0.8:2 thereby providing a second cathode active material as γ-silver vanadium oxide (γ-SVO) having an empirical formula of ($Ag_{1.6}V_4O_{10.8}$); and
c) mixing the ε-SVO with the γ-SVO to provide the cathode active material.

13. The method of claim 12 wherein the cathode active material is of about 55% ε-SVO ($Ag_2V_4O_{11}$) and about 45% γ-SVO ($Ag_{1.6}V_4O_{10.8}$), by weight.

14. The method of claim 12 including selecting the first and second silver-containing materials from the group consisting of Ag, AgI, AgO, $Ag_2O$, $AgNO_3$, $AgNO_2$, $AgCO_3$, $AgVO_3$, $Ag(CH_3CO_2)$, and mixtures thereof.

15. The method of claim 12 including selecting the first and second vanadium-containing materials from the group consisting of $AgVO_3$, $V_2O_5$, $V_2O_4$, $V_2O_3$, $V_3O_7$, $V_4O_9$, $V_6O_{13}$, $NH_4VO_3$, and mixtures thereof.

16. The method of claim 12 including preparing the ε-SVO ($Ag_2V_4O_{11}$) from $AgNO_3$ and $V_2O_5$ mixed in a stoichiometric ratio of Ag:V of 1:2 and heating the mixture to a temperature of about 500° C.

17. The method of claim 16 including heating the mixture in a stepwise process interrupted with periodic mixing.

18. The method of claim 16 including heating the mixture at about 500° C. for about 72 hours.

19. The method of claim 12 including preparing the γ-SVO ($Ag_{1.6}V_4O_{10.8}$) from $AgNO_3$ and $V_2O_5$ mixed in a stoichiometric ratio of AgV of 1:6:4 and heating the mixture to a temperature of about 500° C.

20. The method of claim 19 including heating the mixture at about 500° C. for about 24 hours.

21. The method of claim 12 wherein the first and second silver-containing materials are the same or different and wherein the first and second vanadium-containing materials are the same or different.

22. A method for providing a cathode active material, comprising the steps of:
a) providing at least one silver-containing material and at least one vanadium-containing material in a first mixture and reacting the first mixture to provide a first cathode active material substantially devoid of un-reacted starting materials; and
b) mixing the first cathode active material with a second vanadium-containing material to provide a second mixture and reacting the second mixture to provide the cathode active material.

23. The method of claim 22 including selecting the silver-containing material from the group consisting of Ag, AgI, AgO, $Ag_2O$, $AgNO_3$, $AgNO_2$, $AgCO_3$, $AgVO_3$, $Ag(CH_3CO_2)$, and mixtures thereof.

24. The method of claim 22 including selecting the vanadium-containing material from the group consisting of $AgVO_3$, $V_2O_5$, $V_2O_4$, $V_2O_3$, $V_3O_7$, $V_4O_9$, $V_6O_{13}$, $NH_4VO_3$, and mixtures thereof.

25. The method of claim 22 including heating the first mixture to a temperature of at least about 300° C.

26. The method of claim 22 wherein the first cathode active material has a stoichiometric formula of $Ag_2V_4O_{11}$.

27. The method of claim 22 including heating the second mixture to a temperature of at least about 450° C.

28. The method of claim 22 wherein the cathode active material is a mixture of about 55% ε-SVO ($Ag_2V_4O_{11}$) and about 45% γ-SVO ($Ag_{1.6}V_4O_{10.8}$), by weight.

29. An electrochemical cell comprising an anode, a cathode, and an electrolyte operatively associated with the anode and the cathode, the improvement comprising:
the cathode comprising a cathode active material as a reaction product of at least a first silver-containing material and at least a first vanadium-containing material as starting materials characterized as having been reacted to provide a first silver vanadium oxide, and wherein the first silver vanadium oxide is characterized as having been reacted with at least a second vanadium-containing material to provide a second silver vanadium oxide on a surface of the first silver vanadium oxide.

30. The electrochemical cell of claim 29 wherein the first silver vanadium oxide is selected from the group consisting of $Ag_2V_4O_{11}$ and $Ag_{1.6}V_4O_{10.8}$.

31. The electrochemical cell of claim 29 wherein the second silver vanadium oxide is selected form the group consisting of $Ag_{0.7}V_4O_{5.35}$ and $Ag_{1.6}V_4O_{10.8}$.

32. The electrochemical cell of claim 29 wherein the cathode active material has $Ag_{0.7}V_4O_{5.35}$ as the second silver vanadium oxide formed on an exposed surface of $Ag_2V_4O_{11}$ or $Ag_{1.6}V_4O_{10.8}$ as the first silver vanadium oxide.

33. The electrochemical cell of claim 29 wherein the cathode active material has $Ag_{1.6}V_4O_{10.8}$ as the second silver vanadium oxide formed on an exposed surface of $Ag_2V_4O_{11}$ as the first silver vanadium oxide.

34. The electrochemical cell of claim 29, wherein the first and second vanadium-containing materials are the same or different.

35. The electrochemical cell of claim 34 wherein the first silver vanadium oxide has an empirical formula of $Ag_2V_4O_{11}$ and the second silver vanadium oxide has an empirical formula of either $Ag_{1.6}V_4O_{10.8}$ or $Ag_{0.7}V_4O_{5.35}$.

36. An electrochemical cell comprising an anode, a cathode, and an electrolyte operatively associated with the anode and the cathode, the improvement in the cell comprising:

the cathode comprising a cathode active material as a reaction product of at least a first silver-containing material mixed with at least a first vanadium-containing material in a stoichiometric reaction ratio of Ag:V of substantially 1:2 to provide a first silver vanadium oxide and wherein the first silver vanadium oxide is reacted with at least a second vanadium-containing material to provide a second silver vanadium oxide of a stoichiometrically reduced silver and oxygen content in comparison to the first silver vanadium oxide, wherein the cathode active material has a stoichiometric formula $Ag_xV_4O_y$ with $1.6 \leq x \leq 2.0$ and $10.8 \leq y \leq 11.0$.

37. The electrochemical cell of claim 36 wherein the cathode active material is characterized as having been prepared from a decomposable silver salt and a first vanadium oxide reacted in a decomposition synthesis to provide the first silver vanadium oxide having an empirical formula of $Ag_2V_4O_{11}$, and wherein the first silver vanadium oxide is characterized as having been reacted with a second vanadium oxide heated to a temperature of about 450° C.

38. The electrochemical cell of claim 36 wherein the cathode active material has an empirical formula of $Ag_{1.82}V_4O_{10.91}$.

39. The electrochemical cell of claim 36, wherein the cathode active material is a mixture of about 55% ε-SVO ($Ag_2V_4O_{11}$) as the first silver vanadium oxide and about 45% γ-SVO ($Ag_{1.6}V_4O_{10.8}$) as the second silver vanadium oxide, by weight.

* * * * *